US012770536B2

(12) United States Patent
Kreidler et al.

(10) Patent No.: US 12,770,536 B2
(45) Date of Patent: Oct. 20, 2026

(54) FLIP PLACARD

(71) Applicant: J. J. Keller & Associates, Inc., Neenah, WI (US)

(72) Inventors: Jason J. Kreidler, Sheboygan, WI (US); Robert Larsen, Appleton, WI (US); Cory B Christofferson, Cloquet, MN (US)

(73) Assignee: J. J. Keller & Associates, Inc., Neenah, WI (US)

( * ) Notice: Subject to any disclaimer, the term of this patent is extended or adjusted under 35 U.S.C. 154(b) by 32 days.

(21) Appl. No.: 19/179,131

(22) Filed: Apr. 15, 2025

(65) Prior Publication Data

US 2026/0162567 A1 Jun. 11, 2026

Related U.S. Application Data

(63) Continuation of application No. 18/741,155, filed on Jun. 12, 2024, now Pat. No. 12,536,928.

(51) Int. Cl.
*G09F 9/37* (2006.01)
*G09F 21/04* (2006.01)

(52) U.S. Cl.
CPC .............. *G09F 9/37* (2013.01); *G09F 21/048* (2013.01)

(58) Field of Classification Search
CPC ................................. G09F 9/37; G09F 21/048
See application file for complete search history.

(56) References Cited

U.S. PATENT DOCUMENTS

| | | | | | |
|---|---|---|---|---|---|
| 3,518,782 | A * | 7/1970 | Long | G09F 7/22 | 116/28 R |
| 4,058,918 | A * | 11/1977 | Fund | G09F 7/00 | 40/590 |
| 6,665,967 | B1 * | 12/2003 | Quackenbush | G09F 21/04 | 40/611.12 |
| 2003/0066219 | A1 * | 4/2003 | Palumbo | G09F 23/10 | 40/641 |
| 2018/0374396 | A1 * | 12/2018 | Kucksdorf | G09F 7/18 | |
| 2021/0070236 | A1 * | 3/2021 | Loree | B60R 13/105 | |
| 2021/0192980 | A1 * | 6/2021 | Martin | G09F 7/22 | |
| 2024/0100667 | A1 * | 3/2024 | Ball | B25B 27/0035 | |

OTHER PUBLICATIONS

IP.com search history.*

* cited by examiner

*Primary Examiner* — Gary C Hoge
(74) *Attorney, Agent, or Firm* — Wong Meyer Smith & McConnell

(57) ABSTRACT

A flip placard having a base, a plurality of placards and two securing clips secured to the base. The first securing clip having a first position engaging one of the plurality of placards in at least two locations. The second securing clip engaging a different one of the plurality of placards in at least two locations.

16 Claims, 8 Drawing Sheets

FLIP PLACARD

CROSS REFERENCE TO RELATED APPLICATION

This application is a continuation of U.S. Non-Provisional application Ser. No. 18/741,155, filed Jun. 12, 2024, the entirety of which is hereby incorporated herein by reference.

FIELD OF THE INVENTION

The invention relates to flip placards for use such as on a vehicle.

BACKGROUND OF THE INVENTION

The placards on a flip placard have legends to display different information by flipping the placards. Users, such as drivers, spend extra time finding the correct legend to flip to and display and, in some cases, to discover the flip placard does not contain the correct legend. The placards tend to stick together making it difficult to flip the placards to display the desired legend especially when the user is wearing gloves and manual dexterity is reduced. These problems have been accepted as the way it is by drivers. Drivers have often bent the corners of the placards to create a feature to help them separate and more easily flip placards.

SUMMARY OF THE INVENTION

In one construction, the disclosure provides a flip placard having a base, a first placard, a second placard and only two securing clips secured to the base, the first securing clip having a first position engaging the first placard to hold the first placard in a fixed position and the second securing clip having a first position engaging the second placard to hold the second placard in a fixed position.

In another construction, the disclosure provides a flip placard having a base, a plurality of placards and two securing clips secured to the base, the first securing clip having a first position engaging one of the plurality of placards in at least two locations and the second securing clip engaging a different one of the plurality of placards in at least two locations.

In another construction, the disclosure provides a flip placard having a base, a first placard having first and second apertures therein, a second placard having first and second apertures therein, a first securing clip having two mounting flanges attached to the base, having a first arm, having a second arm and having an elongate portion between the first and the second arms and a second securing clip having two mounting flanges attached to the base, having a first arm, having a second arm and having an elongate portion between the first and the second arms, wherein the first arm of the first securing clip engages the first aperture in the first placard, wherein the second arm of the first security clip engages the second aperture in the first placard, wherein the first arm of the second securing clip engages the first aperture in the second placard and wherein the second arm of the second securing clip engages the second aperture in the second placard.

Other aspects of the disclosure will become apparent by consideration of the detailed description and accompanying drawings.

DETAILED DESCRIPTION OF THE INVENTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

Figure 1:
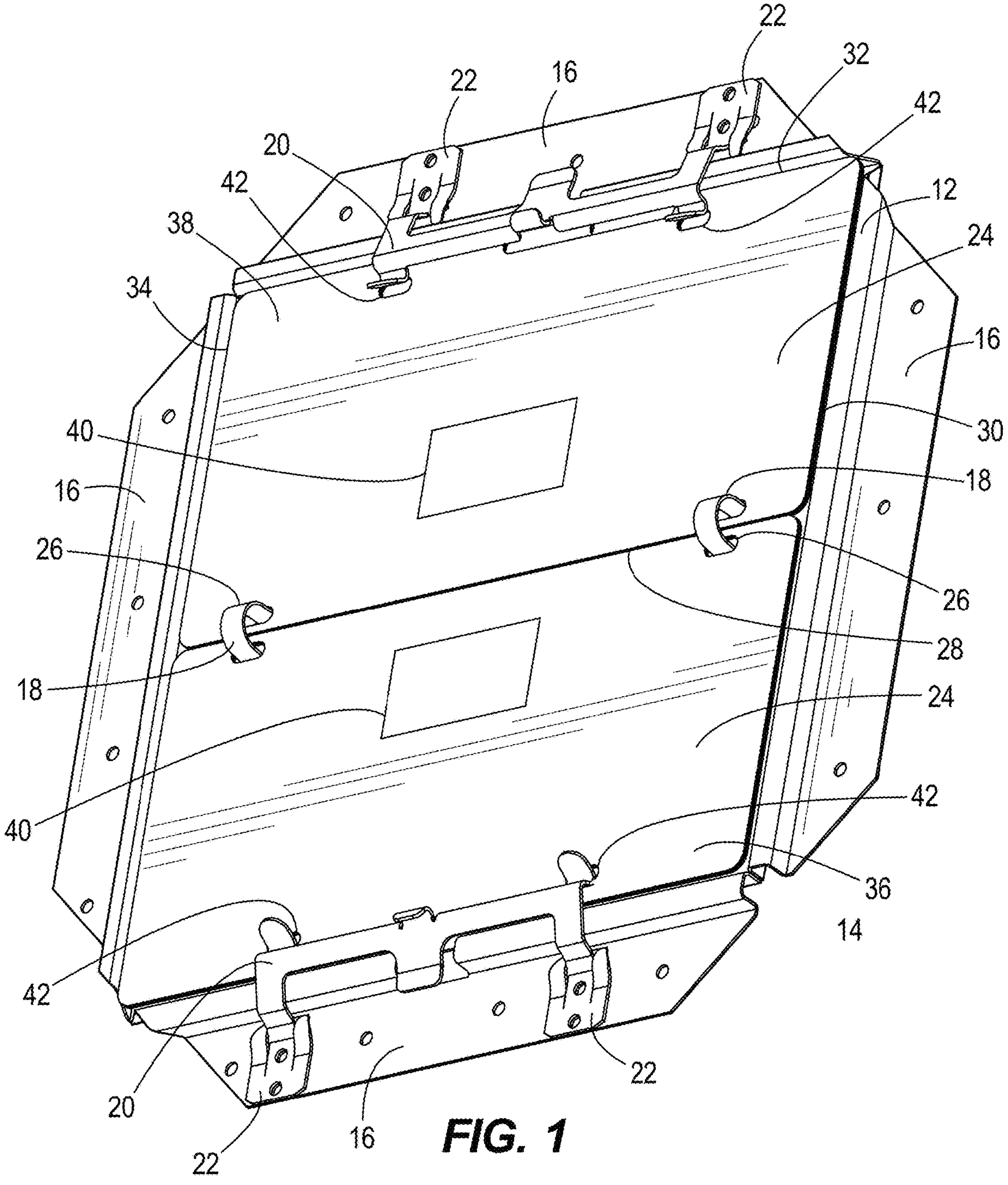
FIG. 1 is a perspective view of a flip placard embodying the invention with securing clips in a first position.

FIG. 1 illustrates a flip placard 10 according to the invention. The flip placard 10 includes a base 12 having therein a recess 14 and having one or more flanges 16 to secure the flip placard 10 to a vehicle (not shown) as is known in the art. Two hinges 18 are mounted on the base 12, however, differing numbers of hinges 18 can be utilized. Securing clips 20 are mounted on the base 12 using mounting flanges 22. As shown, there are two securing clips 20, however, differing numbers of securing clips 20 can be utilized such as, for example, four securing clips and differing numbers of mounting flanges 22 can be utilized.

The flip placard 10 includes placards 24 having indicia thereon such as printed regulatory information to display a legend between two adjacent placards as is known in the art. Each placard 24 includes apertures 26 that house a respective hinge 18 and allow the placards 24 to be movably flipped about the hinges 18. The apertures 26 are positioned along a first edge 28. The placards 24 also have a second edge 30, a third edge 32 and a fourth edge 34, however, any other numbers of edges can be utilized. The placards 24 are secured in a fixed position and not movable about the hinges 18 when a desired legend is shown using the securing clips 22 in a first position engaging the placards as is shown in FIG. 1. The placards 24 are movable about the hinges 18 when the securing clips 22 are in a second position not engaging the placards 24. The placards 24 are stackable in a first stack 36 on one side of the hinges 18, stackable in a second stack 38 on the other side of the hinges 18 and movable between the first stack 36 and the second stack 38. A legend 40 is visible when there is a placard 24 on top of the first stack 36 and a placard 24 on top of the second stack 38. The placards 24 can optionally include apertures 42 that house a portion of a respective securing clip 20 as will be explained in more detail below.

Turning to a first example as shown in FIGS. 2-6 with six placards and five legends, the placards 24 each contain a tab 44 on the third edge 32, however, the tab 44 could also be located on the second edge 30 or the fourth edge 34. As shown, the third edge 32 of each placard 24 is shaped to create the tab 44. As shown, the tab 44 is created from at least one variably located cutout portion 46 which uses less placard material. The placards 24 in FIGS. 4 and 6 have one cutout portion 46 and the placard 24 in FIG. 5 has two cutout portions 46. It should be noted that the tabs 44 can be created in alternative ways such as by differing numbers and shapes of cutout portions 46, by adhering or appending a separate member as the tab 44 or other such methods. The tab 44 can also be of a different material than the remainder of the placard 24. Each tab 44 has two faces and includes indicia on at least one face. The indicia can include text, graphics, or colors, and the like to identify a certain legend.

Figure 2:
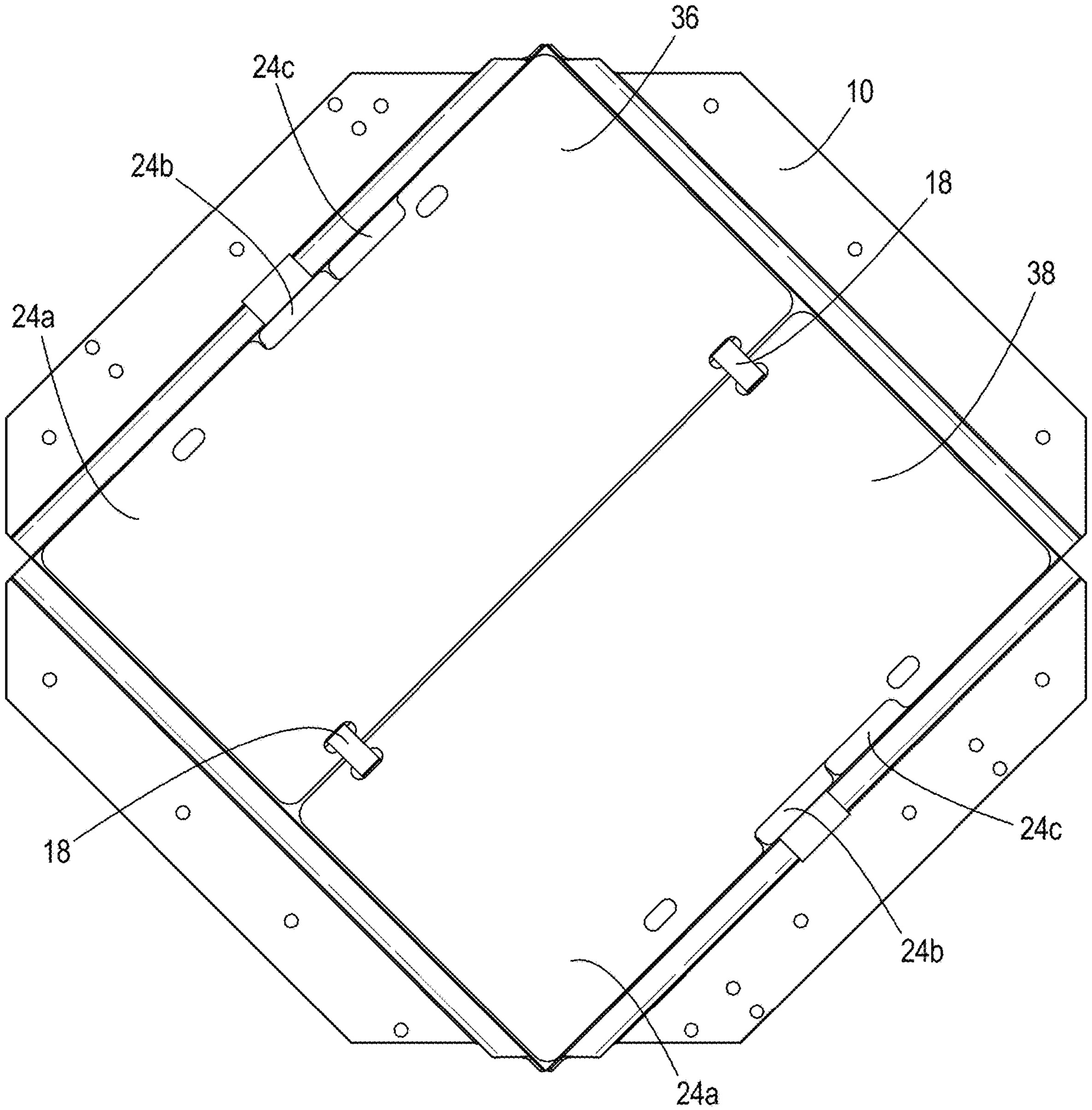
FIG. 2 is a top view of the flip placard showing the securing clips removed for clarity.
Figure 3:
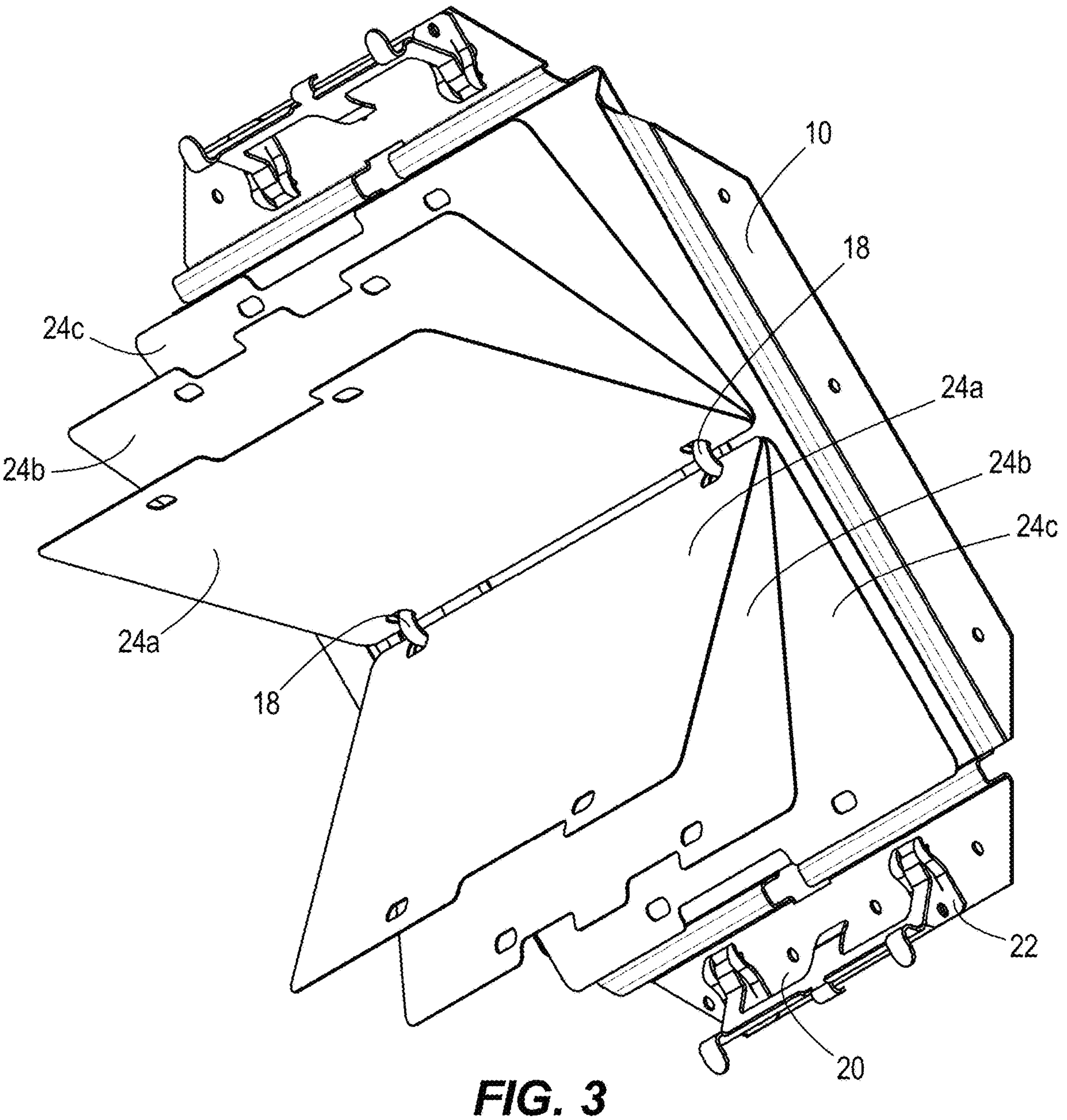
FIG. 3 is a perspective view of the flip placard with the securing clips in a second position.
Figure 4:
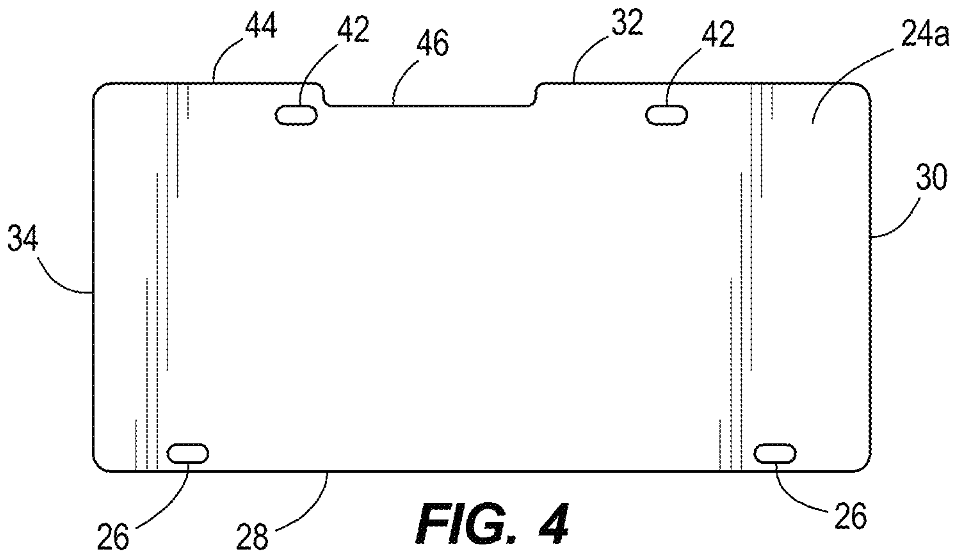
FIG. 4 is a top view of a first placard.
Figure 5:
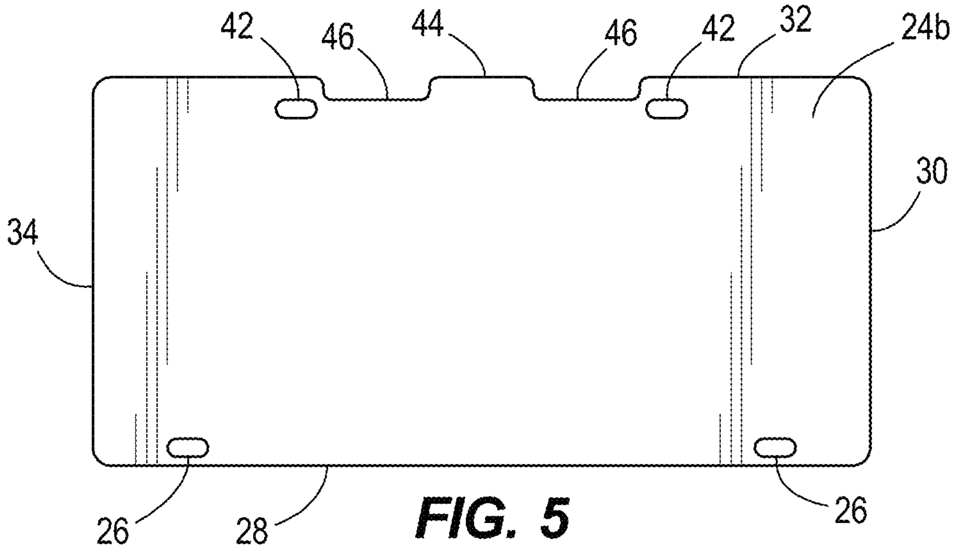
FIG. 5 is a top view of a second placard.
Figure 6:
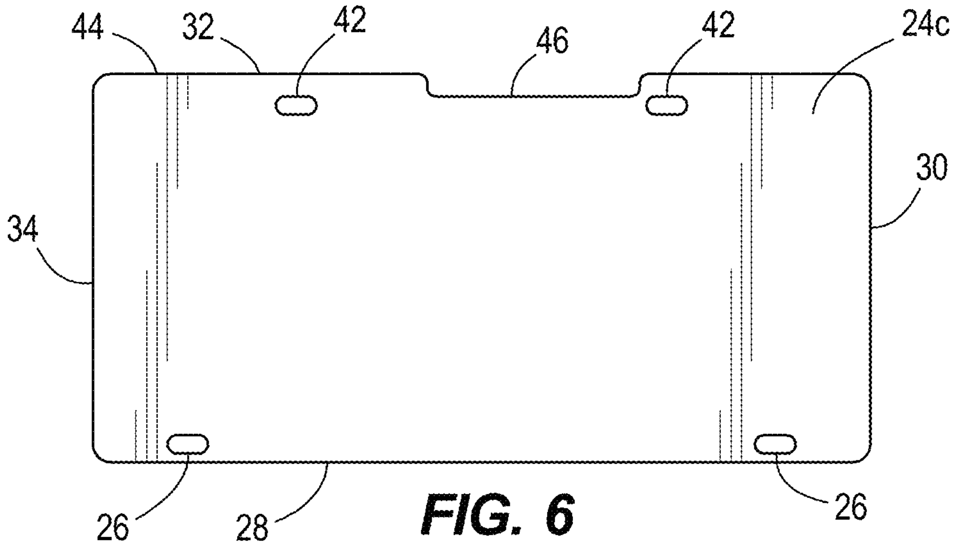
FIG. 6 is a top view of a third placard.

The flip placard 10 shown in FIGS. 2 and 3 is shown with two placards 24*a* having the shape as set forth in FIG. 6, two placards 24*b* having the shape as set forth in FIG. 5 and two placards 24*c* having the shape as set in in FIG. 4. The tabs 44 of the placards 24*a*, 24*b* and 24*c* are positioned at different locations along the third edge 32 so that when any legend is displayed, the tabs 44 of all of the placards 24 are visible. The placards 24*a*, 24*b* and 24*c* are arranged in the order shown in FIGS. 2 and 3. In this orientation, with the securing clips 22 are in the second position not engaging the placards as shown in FIG. 2 (securing clips 20 removed for viewing of the tabs 44) and FIG. 3, the tabs 44 on each placard 24*a*, 24*b* and 24*c* are visible regardless of where the placards 24 are in each stack 36, 38. When the securing clips 20 are in the first position as shown in FIG. 1, the tabs 44 are covered by the securing clips 20. However, it should be noted that this is not required and, in the first position, the securing clips 20 could also not cover the tabs 44.

In use, when a user wants to change a displayed legend on the flip placard 10, the user moves the securing clips 20 to their second position making the tabs 44 on the placards 24*a*, 24*c* and 24*c* visible. The user can then confirm that the legend that is desired to be displayed is a part of the flip placard 10 by viewing indicia on the tabs 44. When located, the user then flips the appropriate placards 24 about the hinges 18 until the desired legend is displayed. The tabs 44 provide the user a better structure to manipulate and flip the placards 24 especially if the user is wearing gloves. The tabs 44 provide leverage to aid a user in separating adjacent placards 24 when they are stuck together such as by moisture, dirt, ice and the like. Cushions can also be added between adjacent placards 24 to create a space to further prevent the placards 24 from sticking together. The securing clips 20 are then moved to the first position to fix the legend on the placards 24 in place.

Turning now to a second example as shown in FIGS. 7-10 with eight placards 24 and seven legends, each placard 24 has a tab 44 on the third edge 32, however, the tab 44 could also be located on the second edge 30 or the fourth edge 34. As shown, each tab 44 is created from at least one variably located cutout portion 46. The placards 24*d*, 24*g* in FIGS. 7 and 10 have one cutout portion 46 and the placards 24*e*, 24*f* in FIGS. 8 and 9 have two cutout portions 46. It should be noted that the tabs 44 can be created in alternative ways such as by differing numbers and shapes of cutout portions 46, by adhering a tab 44 to the third edge 32 or other such methods. Each tab 44 has two faces and includes indicia on at least one face. The indicia can include text, graphics, or colors, and the like to identify a certain legend.

Figure 7:
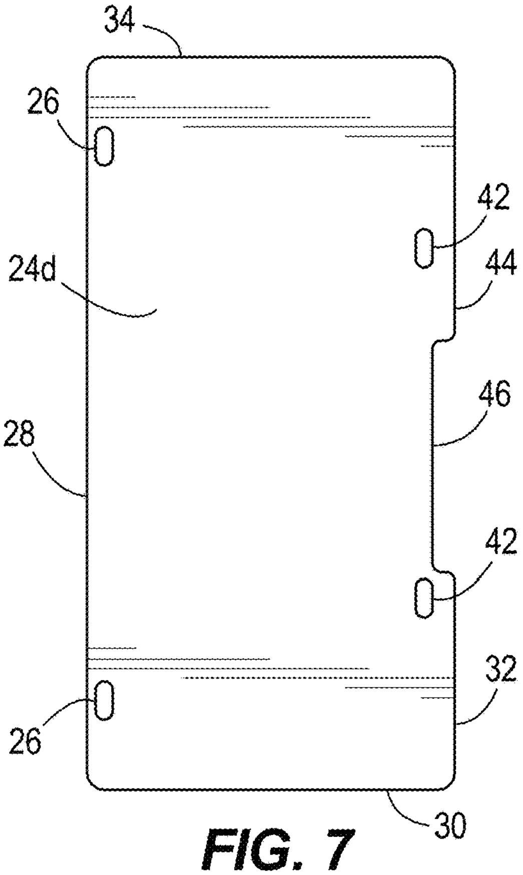
FIG. 7 is a top view of a fourth placard.
Figure 8:
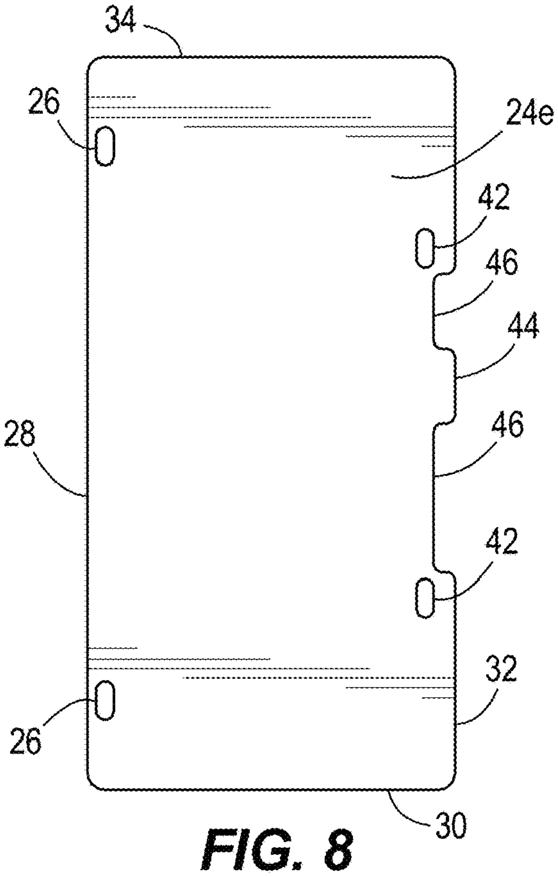
FIG. 8 is a top view of a fifth placard.
Figure 9:
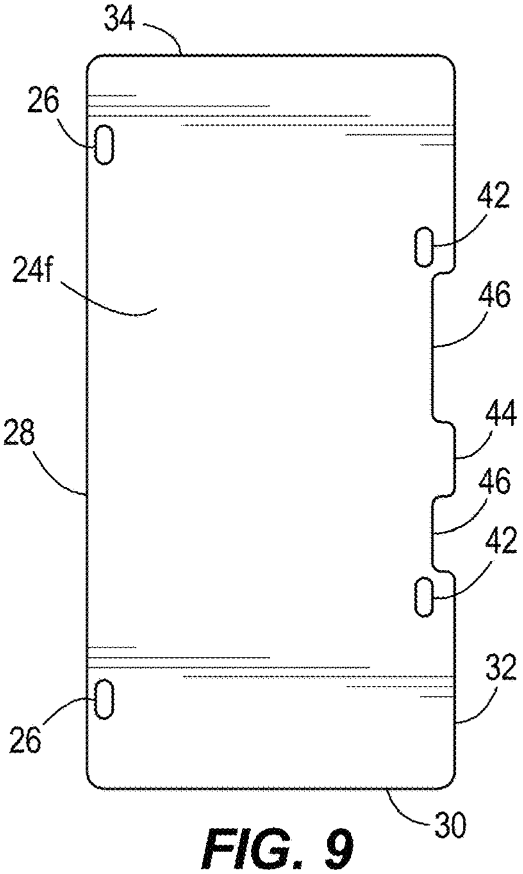
FIG. 9 is a top view of a sixth placard.
Figure 10:
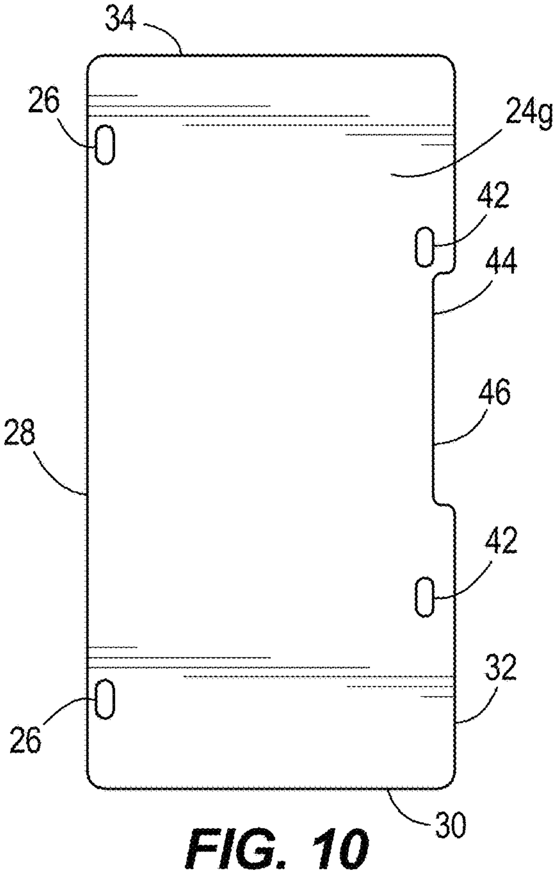
FIG. 10 is a top view of a seventh placard.
Figure 11:
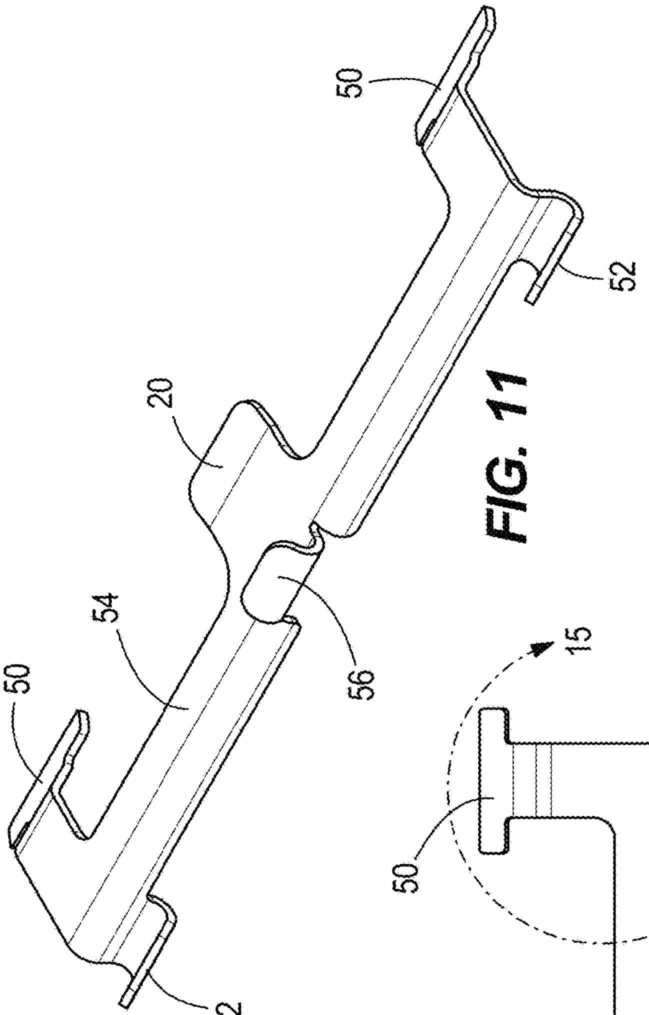
FIG. 11 is a perspective view of a securing clip.
Figure 14:
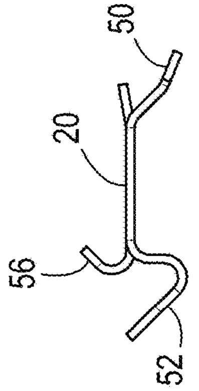
FIG. 14 is an end view of the securing clip.
Figure 12:
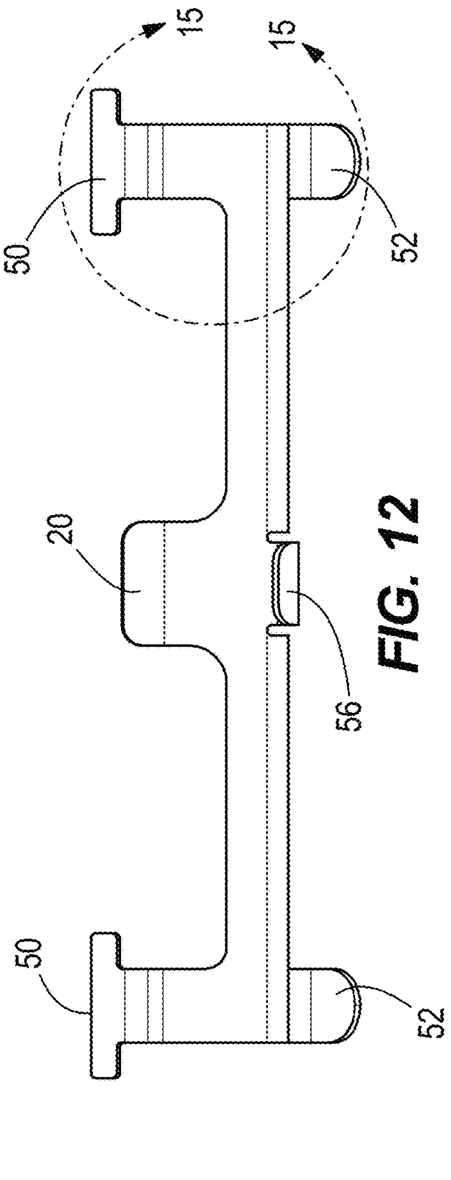
FIG. 12 is a top view of the securing clip.
Figure 13:
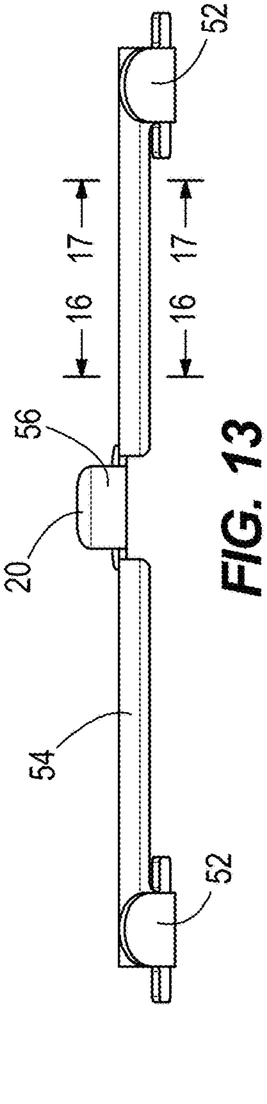
FIG. 13 is a side view of the securing clip.
Figure 15:
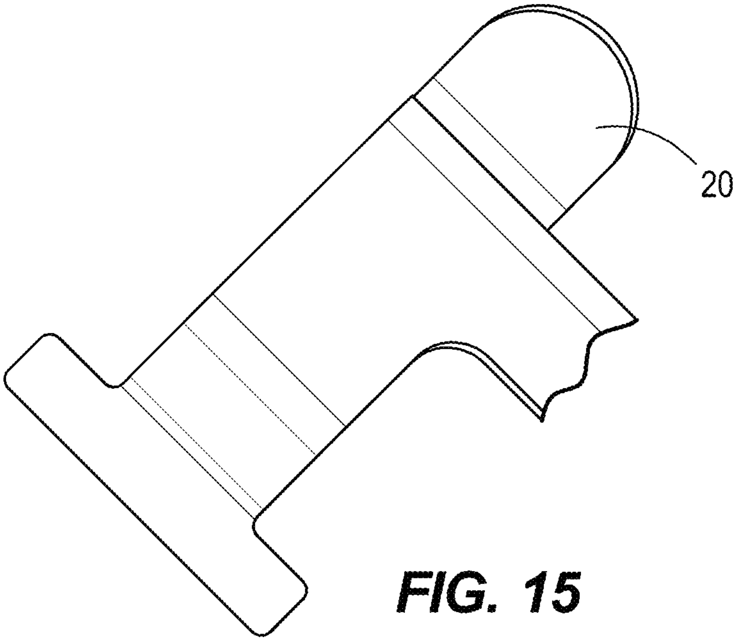
FIG. 15 is a view taken along line 15-15 of FIG. 12.
Figure 16:
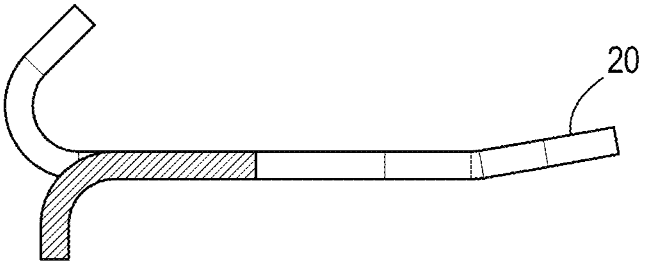
FIG. 16 is a view taken along line 16-16 of FIG. 13.
Figure 17:
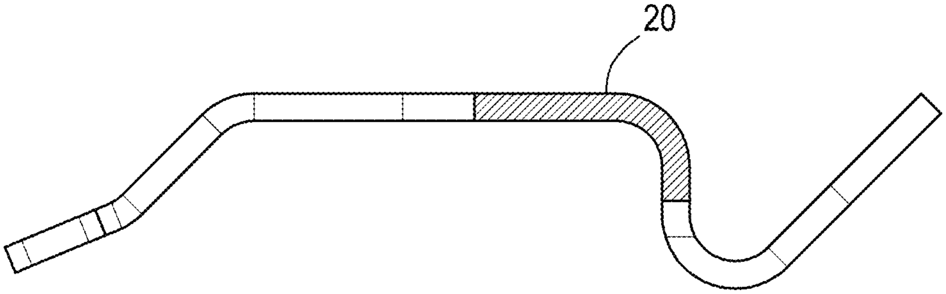
FIG. 17 is a view taken along line 17-17 of FIG. 13.
Figure 18:
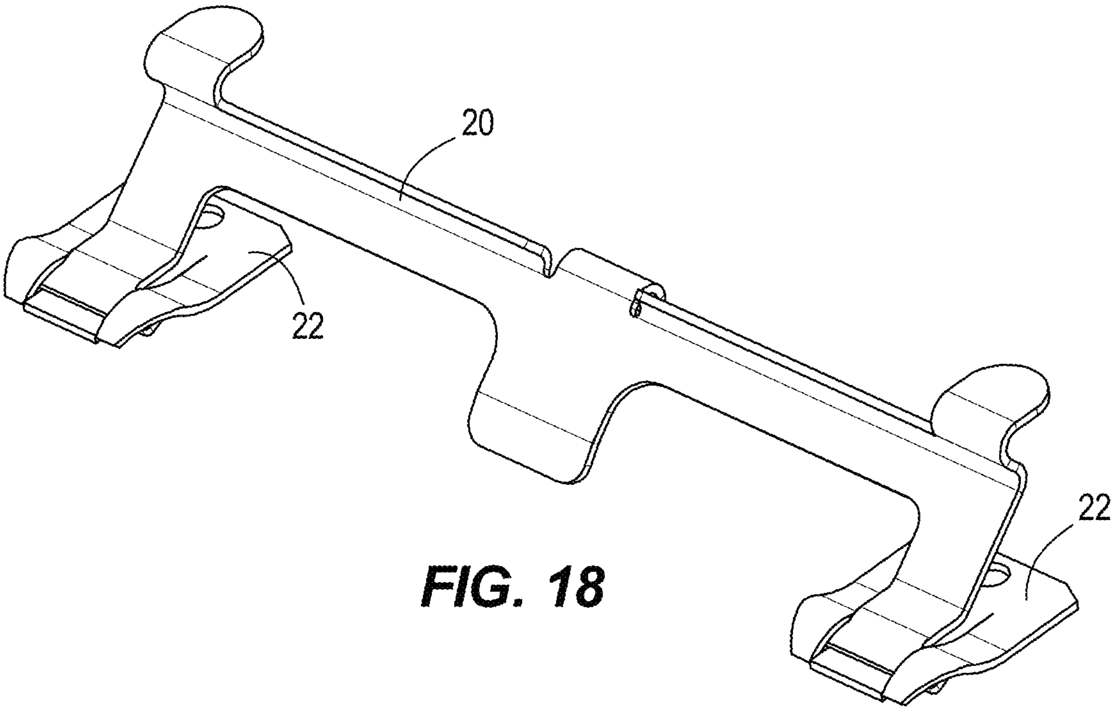
FIG. 18 is a perspective view of the securing clip and a mounting flange.
Figure 19:
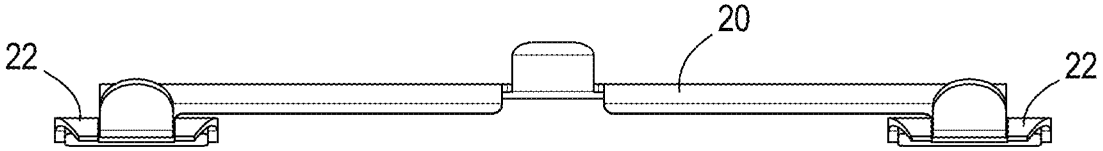
FIG. 19 is a side view of the securing clip and the mounting flange.
Figure 20:
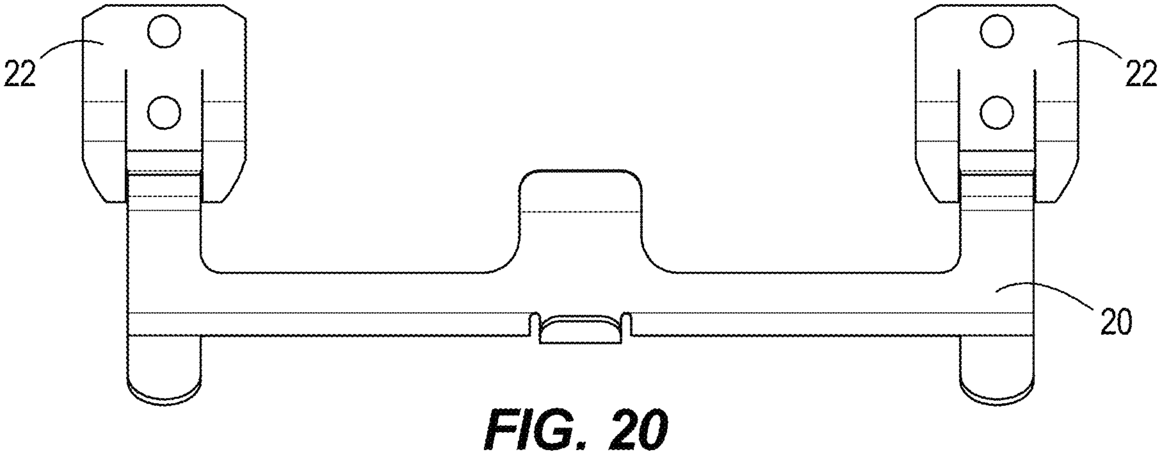
FIG. 20 is a top view of the securing clip and the mounting flange.
Figure 21:
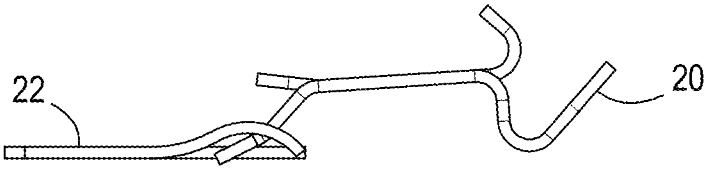
FIG. 21 is an end view of the securing clip and the mounting flange.

In use to create seven legends, the flip placard 10 uses two placards 24*d* having the shape as set forth in FIG. 7, two placards 24*e* having the shape as set forth in FIG. 8, two placards 24*f* having the shape set forth in FIG. 9 and two placards 24*g* having the shape as set in in FIG. 10. The placards 24 are arranged in an order and orientation such that when the securing clips 20 are in the second position not engaging the placards 24, the tabs 44 on each placard 24*d*, 24*e*, 24*f*, 24*g* are visible regardless of which stack 36, 38 they are on. When the securing clips 20 are moved to the first position, the tabs 44 are covered by the securing clips 20. It should be noted that this is not required and, in the first position, the securing clips 20 could also not cover the tabs 44.

In use when a user wants to change a displayed legend on the flip placard 10, the user moves the securing clips 20 to their second position making the tabs 44 on the placards 24*d*, 24*e*, 24*f*, 24*g* visible. The user can then confirm the legend that is desired to be displayed is a part of the flip placard 10 by viewing the indicia on the tabs 44. When located, the user then flips the appropriate placards 24*d*, 24*e*, 24*f*, 24*g* about the hinges 18 until the desired legend is displayed. The securing clips 20 are then moved to the first position to fix the legend on the placards 24 in place.

As the two examples demonstrate, N number of placards can be utilized to form N−1 number of legends. The flip placard 10 of the present invention can mount any number of placards 24 needed to display the desired number of legends for a given vehicle or application.

Turning now to FIGS. 11-17, the securing clip 20 is shown. The securing clip 20 has a pair of arms 50 that engage with the mounting flange 22 as will be explained in more detail below. The securing clip 20 includes a pair of hooks 52. When the securing clip 20 is in the first position, the hooks 52 are housed in the apertures 26 on the placards 24 to keep the placards 24 in a fixed position with a desired legend being visible. The securing clip 20 has an elongate center portion 54 that covers the tabs 44 on the placards 24 when in the first position. The securing clip 20 includes a center hook 56 to enable a user to move the securing clip 20 to its second position to enable viewing to the tabs 44 and changing of the visible legend. As shown in FIG. 1, with the use of two securing clips 20, it is a convenience to the user as the user has to open and close only two securing clips 20 as compared to the traditional four clips, and the user has to open and close only one securing clip 20 on each side of the flip placard 10.

Turning FIG. 18-21 the interaction between the mounting flanges 22 and the securing clip 20 is shown.

Various features and advantages of the invention are set forth in the following claims.

What is claimed is:

1. A flip placard comprising:

a base;

a first placard;

a second placard; and only two securing clips secured to the base, the first securing clip having a first position engaging the first placard to hold the first placard in a fixed position and the second securing clip having a first position engaging the second placard to hold the second placard in a fixed position, wherein at least one of the only two securing clips engages its respective placard in two locations.

2. The flip placard of claim 1 wherein each securing clip is secured to the base using two mounting flanges.

3. The flip placard of claim 1 wherein each securing clip is moveable to a second position not engaging either the first or the second placard.

4. The flip placard of claim 1 wherein each securing clip includes a first arm, a second arm and a central portion therebetween.

5. The flip placard of claim 1 wherein the first securing clip engages the first placard in at least two locations, and wherein the second securing clip engages the second placard in at least two locations.

6. The flip placard of claim 1 wherein the first and second placards each have a plurality of apertures therein, wherein the first securing clip engages at least one of the apertures on the first placard to hold the first placard in the fixed position, and wherein the second securing clip engages at least one of the apertures on the second placard to hold the second placard in the fixed position.

7. The flip placard of claim 1 wherein the first and second placards each have a plurality of apertures therein, wherein each security securing clip has two arms, wherein the two arms of the first securing clip engage apertures on the first placard, and wherein the two arms of the second securing clip engage apertures on the second placard.

8. The flip placard of claim 1 wherein the first securing clip has a center hook for engaging the first placard, and wherein the second securing clip has a center hook for engaging the second placard.

9. The flip placard of claim 1 wherein the first and second placards each have a plurality of apertures thereon, wherein each securing clip has a center hook, and wherein each center hook engages with at least one aperture.

10. A flip placard comprising:

a base;

a plurality of placards; and two securing clips secured to the base, the first securing clip having a first position engaging one of the plurality of placards in at least two locations and the second securing clip engaging a different one of the plurality of placards in at least two locations.

11. The flip placard of claim 10 wherein each securing clip is secured to the base using two mounting flanges.

12. The flip placard of claim 10 wherein each securing clip is moveable to a second position not engaging the plurality of placards.

13. The flip placard of claim 10 wherein each securing clip includes a first arm and a second arm to engage the two locations.

14. The flip placard of claim 10 wherein the plurality of placards each have a plurality of apertures therein, wherein the first and the second securing clips engage at least one of the apertures to hold the plurality of placards in the fixed position.

15. The flip placard of claim 10 wherein the first position of the first securing clip holds at least one of the plurality of placards in a fixed position, and wherein the first position of the second securing clip holds at least one of the plurality of placards in a fixed position.

16. A flip placard comprising:

a base;

a first placard having first and second apertures therein;

a second placard having first and second apertures therein;

a first securing clip having two mounting flanges attached to the base, having a first arm, having a second arm and having an elongate portion between the first and the second arms; and a second securing clip having two mounting flanges attached to the base, having a first arm, having a second arm and having an elongate portion between the first and the second arms, wherein the first arm of the first securing clip engages the first aperture in the first placard, wherein the second arm of the first securing clip engages the second aperture in the first placard, wherein the first arm of the second securing clip engages the first aperture in the second placard and wherein the second arm of the second securing clip engages the second aperture in the second placard.

* * * * *